United States Patent [19]

Weber, Sr.

[11] Patent Number: 4,514,926
[45] Date of Patent: May 7, 1985

[54] SNAGGED FISH HOOK RELEASE DEVICE

[76] Inventor: Richard E. Weber, Sr., 3719 Sarah St., Franklin, Ohio 45005

[21] Appl. No.: 575,282

[22] Filed: Jan. 30, 1984

Related U.S. Application Data

[63] Continuation-in-part of Ser. No. 183,434, Sep. 2, 1980, abandoned, Continuation of Ser. No. 419,730, Sep. 20, 1982, abandoned.

[51] Int. Cl.³ ............................................. A01K 97/00
[52] U.S. Cl. ..................................... 43/17.2; 403/229; 43/42.72
[58] Field of Search ................. 43/17.2, 42.02, 42.72; 403/229

[56] References Cited

U.S. PATENT DOCUMENTS

| | | | |
|---|---|---|---|
| 575,451 | 1/1897 | Yost | 403/229 |
| 1,444,876 | 2/1923 | Hanson | 43/42.72 |
| 1,798,418 | 3/1931 | Hertzberg | 403/229 |
| 2,606,390 | 8/1985 | Farmer | 43/42.72 |
| 2,739,407 | 3/1956 | Godsey | 43/42.72 |
| 3,011,284 | 12/1961 | Sawyer | 43/42.72 |

Primary Examiner—Nicholas P. Godici
Assistant Examiner—C. McKee
Attorney, Agent, or Firm—Louis E. Hay

[57] ABSTRACT

A release device for installing between the end of a fishing line and fish hook for freeing a snagged fish hook, the device including a normally closed elongated helical tension spring having a weight attached to the line end of the spring. The device is activated by pulling on the line to stress and elongate the spring which moves the attached weight. A sudden release of the taut line permits a rapid return of the spring to its closed position at which time the kinetic energy of the weight coming to an abrupt halt at the end of the closed spring is transferred into a shock wave passing through the spring and is transmitted to the snagged fish hook to drive the fish hook from its snagged position.

7 Claims, 10 Drawing Figures

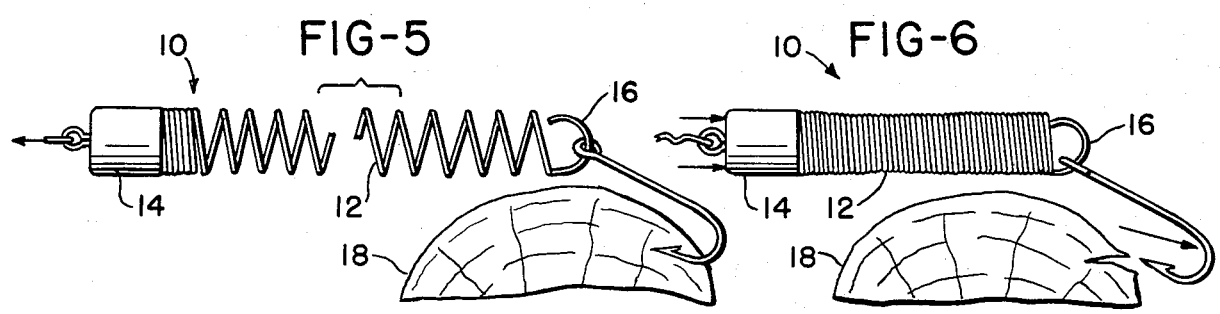
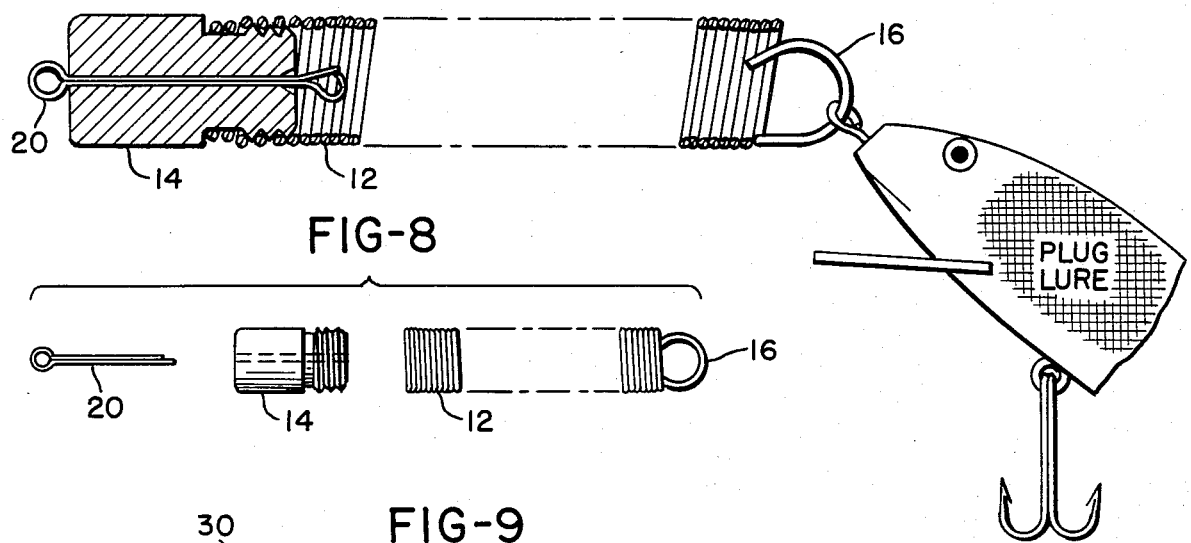
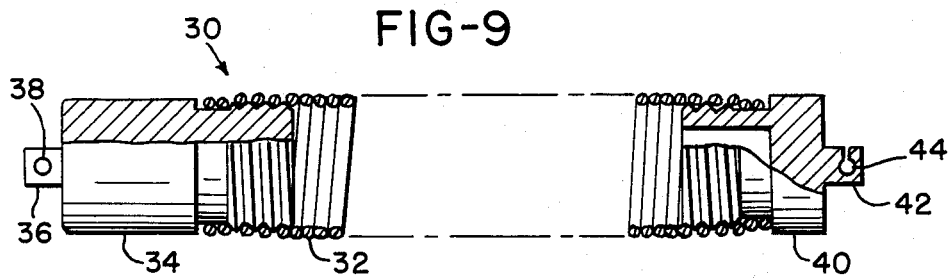
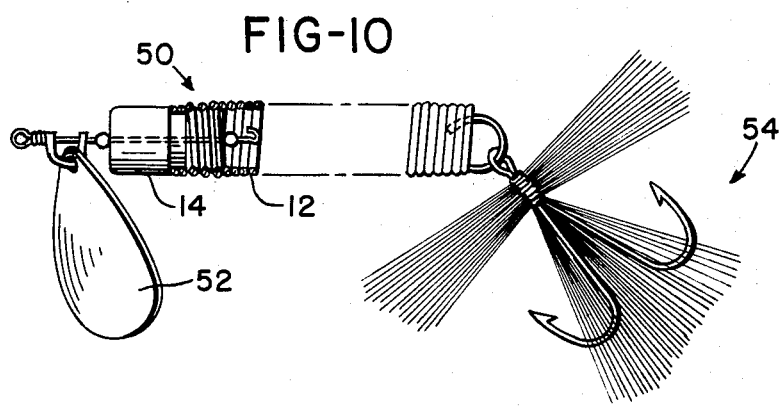

SNAGGED FISH HOOK RELEASE DEVICE

REFERENCE TO RELATED APPLICATIONS

This is a continuation application of parent application Ser. No. 183,434 Snagged Fish Hook Release Device filed Sept. 2, 1980 now abandoned and co-pending continuation application Ser. No. 419,730 Snagged Fish Hook Release Device filed Sept. 20, 1982 now abandoned.

REFERENCE TO RELATED PATENT

The best known prior art is U.S. Pat. No. 2,616,203 Sarakas.

BACKGROUND OF THE INVENTION

This invention relates to the recurring problem encountered by all fishermen, and especially those who fish in streams and bodies of water in wooded areas. Such streams and bodies of water all have invisible submerged objects such as stumps and waterlogged branches on which the fisherman's line will become snagged, usually when the fisherman starts to reel in his line and the point of the hook engages the far side of the obstruction. The harder the fisherman pulls on his line, the more firmly the hook becomes embedded in the obstruction. Usually the fisherman has no alternative to fighting his line until either the hook disengages from the obstruction, or, the line breaks and he loses a portion of the line and often an expensive lure.

SUMMARY OF THE INVENTION

The essential elements of the invention are an elongated helical tension spring and a weight attached to one end of the spring. The free end of the spring is provided with means for removably receiving a fish hook or a lure with one of more attached fish hooks. The free end of the weight is provided with means to which the end of the fishing line may be attached; thus in use, the release device is attached between the end of the line and the hook.

When the hook is snagged on an obstruction, pulling on the line will stretch and stress the tension spring, the entire movement of the spring being away from the hook. Since the weight moves with the free end of the spring, it now has potential energy. A sudden release of the taut line will permit the spring to rapidly return to its normally closed position, and the potential energy of the weight is transformed to kinetic energy which creates a shock wave when the moving weight is abruptly stopped by the closed spring. This shock wave drives the snagged hook and frees it from the obstruction.

The nearer the closed spring approaches the characteristics of a solid member, the more effective it will be in transmitting the shock wave. For this reason the spring is preferably very tightly wound and should have residual stress in the closed position to hold the coils snugly against each other.

BRIEF DESCRIPTION OF THE DRAWINGS

FIG. 5 is a view of the release device with the fish hook snagged and the tension spring stretched by a pull on the line;

FIG. 6 is a view similar to FIG. 5 after the weight strikes the spring and dislodges the fish hook from the obstruction;

FIG. 7 is a vertical cross-section of the release device showing construction details and being attached to a plug lure;

FIG. 8 is an exploded view of the device;

FIG. 9 is a view similar to FIG. 7 and illustrating a second embodiment of the invention; and, FIG. 10 illustrates the release device with a spinner at the line end and having a feathered treble hook at the other end.

DESCRIPTION OF THE PREFERRED EMBODIMENT

Figure 1:
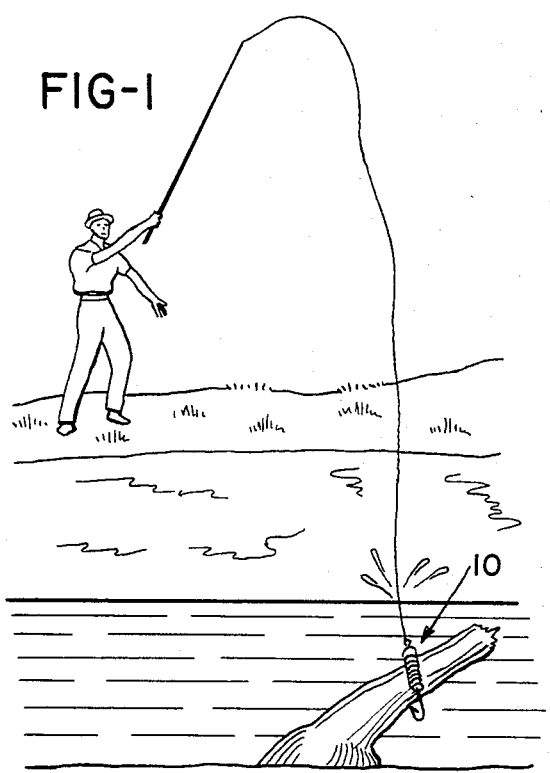
FIG. 1 is a schematic illustrating a fisherman casting a line, having a release device in accordance with the present invention, in the proximity of a submerged obstruction.
Figure 2:
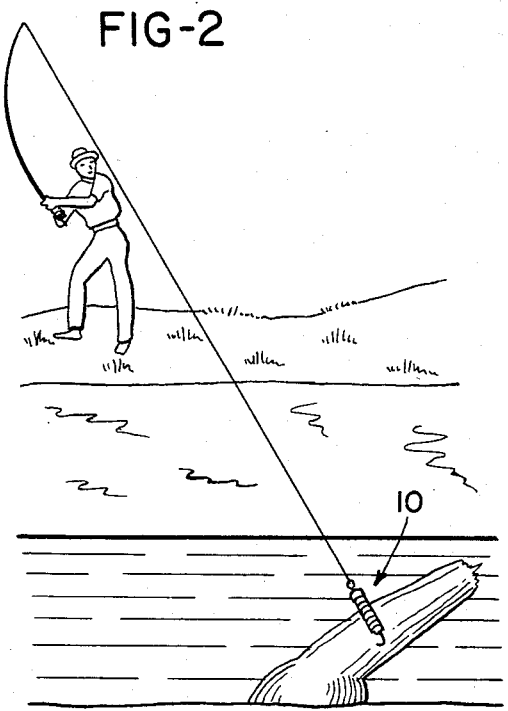
FIG. 2 is a schematic illustrating the fish hook on the release device becoming snagged on the obstruction.
Figure 3:
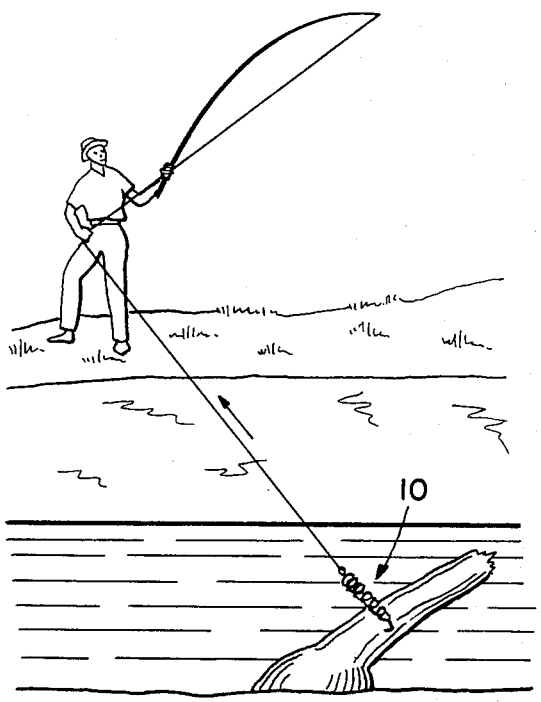
FIG. 3 is a schematic illustrating the preferred manner of positioning the line and stretching the tension spring of the release device preparatory to unsnagging the fish hook.
Figure 4:
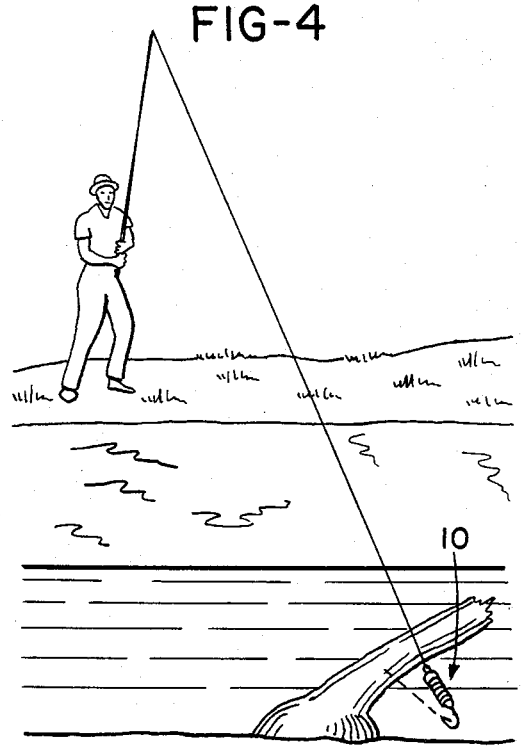
FIG. 4 is a schematic illustrating the unsnagged fish hook permitting the fisherman to commence reeling in the line.

Specific reference is made to FIGS. 5–6 in which the release device 10 has a closely wound helical tension spring 12 and a weight 14 attached to the line end thereof to move with the spring as it is stretched and allowed to return to the normally closed position. The opposite end of the spring is formed to have a conventional transverse loop end 16 which releasably holds a fish hook of any conventional hooked lure as used by fishermen. FIG. 5 depicts the fish hook snagged into a log obstruction 18, and with the spring stretched as depicted in FIG. 3. FIG. 6 depicts the same hook after being dislodged by action of the release device 10, as also depicted in FIG. 4.

The release device 10 operates on the well known principle that a moving mass resists change in its velocity, and that an abrupt stopping of the mass will transform its inertia or kinetic energy into a shock wave which is useful in applications where a relatively large amount of energy is to be released in a very short period of time. A very simple example of this principle is in the cracking of a hard shelled nut, such as a black walnut, by placing the walnut on an anvil and then striking the nut with a hammer. The nut would resist several hundred pounds of steadily applied pressure; however, a relatively light blow by the hammer would break the nut into several pieces. In the present case, it is the shock wave which dislodges the hook from the obstruction.

In order to be most effective, the spring should have closely wound helices or coils in order that, when the spring is in its normally closed position, the coils will abut against adjacent coils to form a solid column which, by its nature, is most effective in transmitting the shock wave. Any gap between the coils will diminish the shock wave because a portion of the energy will be expended in compressing the spring.

Ideally, the spring should also have some residual stress when in its normally closed position. There are any number of alloys, well known to the art, which are suitable for making excellent springs for use in the present situation.

FIGS. 7–8 depict one convenient method for affixing the weight to the spring, and also one method for forming a rotatable line connector to the weight. The weight 14 may be of any convenient shape; however, as depicted it is easily mass produced on an automatic screw machine from bar stock.

The portion of the weight which enters the spring is threaded to the same pitch as the closed spring; however, the diameter is made slightly larger than the inside diameter of the spring in order that the thread on the weight engages the spring with an interference fit. The weight is provided with an undercut as depicted. The first turn or two of the spring engages the undercut, and tests have indicated that, if the components are properly sized, the weight cannot be unscrewed from the spring without mutilation. In other words, the weight will not accidentally detach from the spring in normal usage.

One convenient method for forming a line connector which may be rotatable is to use an ordinary cotter pin 20 as depicted in FIG. 8. Before the weight is attached to the spring, the cotter pin is passed through a slightly oversized bore in the weight, as best depicted in FIG. 7. The ends of the cotter pin stem elements are then bent in a manner to prevent extraction of the cotter pin from the weight. A very effective method is to bend the ends of the stem elements as depicted.

FIG. 9 depicts a modification of the above-described release device 10. The release device 30 depicted in FIG. 9 uses a tension spring having comparable characteristics to the tension spring 12 previously described with the exception that both ends are square ends. The weight 34 is attached to tension spring 32 in the same manner as weight 14 was attached to tension spring 12. In lieu of the cotter pin 20 to which a line may be attached, weight 34 has an integral boss 36 having an aperture 38 for receiving the line.

The other change in the design depicted in FIG. 9 over the previously described release device 10 is at the end for receiving the fish hook. An end plug 40 is machined for engagement with tension spring 32 in the same manner as the weight 14 was machined for attachment to tension spring 12. The end plug has an integral boss 42 containing an aperture 44 and a slot for releasably retaining a fish hook. Other arrangements may be used within the scope of the present invention. As depicted, the end plug 40 is hollowed out to reduce weight, since it is desirable to hold the weight to a minimum in relationship to the mass of weight 34.

Specific reference is now made to FIG. 10 in which release device 50 has a spoon 52 attached to the line end, and a feathered treble hook 54 attached to the opposite end. Both the spoon 52 and the treble hook 54 are well known standard items with fishermen and require no further description.

The tension spring is spring 12 used with release device 10. The weight is weight 14 used with release device 10. In lieu of a cotter pin 20 for attaching the line, the arrangement depicted is a very common means used on many commercially available lures using a spoon.

Several variations of a release device have been depicted and described. Various types of hooked contrivances for catching fish have also been depicted in connection with the release device. Withing the scope of the invention, contrivances for catching fish include single hooks as depicted in FIGS. 5–6; multiple hooks; plug lures as depicted in FIG. 7 and having a plurality of either single or multiple hooks; and lures as depicted in FIG. 10 and having a spoon and hooks.

The release device of the present invention can be made in various sizes for use with various size hooks. Consideration in selecting the spring must be given to the force required to land a fish having a given weight in order that the spring is not overstressed in use.

It is to be understood that the embodiments of the present invention as shown and described are to be regarded merely as illustrative, and that the invention is susceptible to variations, modifications and changes, without regard to specific construction methods, within the scope of the appended claims.

I claim:

1. In a snagged fish hook release device for disposing between a hook and a line on fishing tackle, the improvement in combination therewith which consists of only two parts specifically comprising:
   (a) an elongated helically wound tension spring having a first end with means thereon for detachably joining directly to the eye at the end of the shank on said fish hook, and having an open second end; and,
   (b) an elongated weight having a first end externally threaded for threadably engaging the open end of said spring, and with an unthreaded extending second end having means thereon for the attachment of said line, the inward end of the thread on the first end of said weight directly adjacent to the extending second end of said weight having a reduced diameter undercut with respect to the minor diameter of said first threaded end for receiving at least the first coil on the open end of said spring when assembled on said weight for resisting separation of said weight from said spring when said spring is rotated.

2. A release device in accordance with claim 1 in which the threaded end of said weight engages said spring with an interference fit.

3. In a snagged fish hook release device for disposing between a hook and a line on fishing tackle, the improvement in combination therewith which consists of only two parts specifically comprising:
   (a) an elongated helically wound tension spring with closely wound coils abutting against adjacent coils and having a first end with means thereon for detachably joining directly to the eye at the end of the shank on said fish hook, and having an open second end; and,
   (b) an elongated weight having a first end externally threaded and threadably engaging the open end of said spring, and with an unthreaded extending second end having a cross-sectional area greater than the cross-sectional area of the threaded end of said weight, and further having coaxial means thereon for the attachment of said line, the inward end of the thread on the first end of said weight directly adjacent to the extending second end of said weight having a reduced diameter undercut with respect to the minor diameter of said first threaded end for receiving at least the first coil on the open end of said spring when assembled on said weight for resisting separation of said weight from said spring when said spring is rotated.

4. A release device in accordance with claim 3 in which the threaded end of said weight engages said spring with an interference fit.

5. In a snagged fish hook release device for disposing between a hook and a line on fishing tackle, the improvement in combination therewith which consists of only two parts specifically comprising:

(a) an elongated helically wound tension spring with closely wound coils abutting against adjacent coils when in the normally closed attitude, and having a first end terminating in a transverse loop thereon for detachably joining said spring directly to the eye at the end of the shank on said fish hook, and having an open second end; and, (b) an elongated weight having a first end externally threaded and threadably engaging the open end of said spring, and with a coaxial extending second end having a cross-sectional area greater than the cross-sectional area of the threaded end of said weight, and further having coaxial swivel means protruding from the outer face of the second end of said weight for attachment of said line, the inward end of the thread on the first end of said weight directly adjacent to the extending second end of said weight having a reduced diameter undercut with respect to the minor diameter of said first threaded end for receiving at least the first coil on the open end of said spring when assembled on said weight for resisting separation of said weight from said spring when said spring is rotated.

6. A release device in accordance with claim 5 in which the threaded end of said weight engages said spring with an interference fit.

7. A release device in accordance with claim 5 in which said spring has residual stress when in the normally closed attitude.

* * * * *